US007671288B2

(12) United States Patent
Chung et al.

(10) Patent No.: US 7,671,288 B2
(45) Date of Patent: Mar. 2, 2010

(54) SWITCH APPARATUS FOR HORN DEVICE OF VEHICLE

(75) Inventors: Tae Wook Chung, Seoul (KR); Seoung Hoon Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/391,913

(22) Filed: Feb. 24, 2009

(65) Prior Publication Data

US 2010/0006409 A1 Jan. 14, 2010

(30) Foreign Application Priority Data

Jul. 10, 2008 (KR) ..................... 10-2008-0067014

(51) Int. Cl.
*H01H 9/00* (2006.01)

(52) U.S. Cl. ............. 200/61.54; 200/61.55; 200/61.56; 280/728.2; 280/728.3; 280/731

(58) Field of Classification Search ... 200/61.54–61.56; 280/728.2, 728.3, 731
See application file for complete search history.

(56) References Cited

U.S. PATENT DOCUMENTS

| | | | | |
|---|---|---|---|---|
| 5,002,306 | A * | 3/1991 | Hiramitsu et al. | 280/731 |
| 5,198,629 | A * | 3/1993 | Hayashi et al. | 200/61.54 |
| 5,371,333 | A * | 12/1994 | Kanai et al. | 200/61.54 |
| 5,508,482 | A * | 4/1996 | Martin et al. | 200/61.55 |
| 5,593,177 | A * | 1/1997 | Ricks | 280/731 |
| 6,244,618 | B1 * | 6/2001 | Yokota | 280/728.3 |
| 6,600,114 | B2 * | 7/2003 | Kikuta et al. | 200/61.55 |
| 6,719,323 | B2 * | 4/2004 | Kai et al. | 280/731 |
| 6,722,694 | B1 * | 4/2004 | Nakashima et al. | 280/736 |
| 7,159,897 | B2 * | 1/2007 | Worrell et al. | 280/731 |

* cited by examiner

*Primary Examiner*—Michael A Friedhofer
(74) *Attorney, Agent, or Firm*—Morgan, Lewis & Bockius LLP

(57) ABSTRACT

A switch apparatus for the horn device of a vehicle includes an inflator housing and a terminal unit provided in the inflator housing and configured to include a first contact element connected to the inflator and a second contact element connected to the inflator housing. A switching plate is installed using elastic members, which are spaced apart and insulated from the inflator housing, so that the switching plate makes contact with the inflator housing if the inflator housing is pressed, thereby operating the horn. A connector unit is coupled to the terminal unit with inflator wires and a horn wire, and is provided therein with a first connection element and a second connection element so that the horn wire and the inflator housing are electrically connected to each other.

18 Claims, 6 Drawing Sheets

342 320 344 300 520 340 324 500 322 342

SWITCH APPARATUS FOR HORN DEVICE OF VEHICLE

CROSS-REFERENCE TO RELATED APPLICATIONS

The present application claims priority to Korean Patent Application Number 10-2008-0067014 filed Jul. 10, 2008, the entire contents of which are incorporated herein for all purposes by this reference.

BACKGROUND OF THE INVENTION

1. Field of the Invention

The present invention relates to a switch apparatus for the horn device of a vehicle, which is installed in the airbag provided in the steering wheel of the vehicle and configured in such a way that a plate inside the airbag makes contact with a switching plate connected to the horn device when a driver applies pressure to the airbag, thereby sounding a horn.

2. Description of Related Art

An airbag is mounted in the steering wheel of a vehicle. A switch for a horn device is provided in the back side of the airbag and inside the steering wheel. The horn device is installed in the front of the hood of the vehicle. When a driver applies pressure to the airbag inside the vehicle, the switch contact is made to the horn device, so that a horn signal is generated.

FIG. 1 is a view showing a conventional steering wheel. FIG. 2 is a view showing a conventional switch apparatus for horn device. The steering wheel includes a handle 10 configured to allow a driver to adjust the steering angle, and an airbag unit 30 equipped in the center of the handle. An airbag housing is provided inside the airbag unit 30, and an airbag cushion and an inflator are installed inside the airbag housing.

The inflator 31 is connected with inflator wires 34 through a connector unit 35, the inflator wires allowing an explosion signal to be applied to the inflator so that the airbag is deployed. The inflator 31 is provided with a switch apparatus for operating the horn device of a vehicle on the back side thereof. When a driver applies pressure to the airbag unit 30 of the steering wheel, a switch provided on the back side of the inflator 31 is operated at the same time that the airbag is pressed, thereby sounding a horn.

The switch for horn device includes two plates 32 and 33, and the two plates 32 and 33 are coupled to and face each other while maintaining repulsive force. Each of the plates 32 and 33 is electrically connected to the horn apparatus and performs switching depending on whether contact is made. One plate 32 is coupled to the back side of the inflator 31, and the other plate 33 is installed using an elastic spring and spaced apart at a predetermined interval. A horn wire 36, connected to the horn apparatus, is connected to the plate 32, coupled to the back side of the inflator, using a connector unit 37.

However, according to the conventional switch for horn device, a separate horn wire is provided so as to realize the switching of the horn apparatus, and a connector unit should be used to connect the horn wire, so that costs for components are increased and the number of manufacturing steps is increased.

Further, pressure is applied to a horn wire between the plate of the back side of an inflator and a steering wheel, so that problems occur in that the horn wire is broken and that a connector unit becomes separated. During the assembly, a phenomenon in which an airbag unit comes off the steering wheel occurs due to the horn wire, and the assembly is difficult.

Those facts that have been described as the related art are provided only to promote easy understanding of the background of the present invention, and it should not be interpreted that they correspond to the related art well known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a switch apparatus for horn device, which solves those problems of the difficulty of assembly incurred when a separate horn wire and a connector unit are used, the increase of the number of components and manufacturing steps, and the separation of the connector unit.

In an aspect of the present invention, a switch apparatus for horn device of a vehicle, may include an inflator housing installed in a steering wheel of the vehicle, and configured to accommodate an airbag inflator, wherein the inflator housing and the airbag inflator are insulated therebetween, a terminal unit provided in the inflator housing, and configured to include a first contact element electrically connected to the inflator accommodated in the inflator housing and a second contact element electrically connected to the inflator housing, a switching plate electrically connected to the horn device and installed to be spaced apart from the inflator housing, the switching plate being biased from the inflator housing by using insulated elastic member so that the switching plate makes electrical contact with the inflator housing in case that external pressure applied to the inflator housing is sufficiently enough to surmount an elastic force of the insulated elastic member, thereby operating the horn device, and/or a connector unit coupled to the terminal unit, the connector unit having inflator wires and a horn wire inserted into one end of the connector unit and provided therein with a first connection element for connecting the inflator wires to the first contact element of the terminal unit and a second connection element for connecting the horn wire to the second contact element of the terminal unit so that the horn wire and the inflator housing are electrically connected each other.

The terminal unit may have a depression into which the connector unit is inserted, the first contact element of the terminal unit includes pins provided inside the terminal unit, and the first connection element of the connector unit includes clips embedded in the connector unit so that the first contact element is inserted thereto.

The terminal unit may have a depression into which the connector unit is inserted, the first contact element of the terminal unit includes clips provided inside the terminal unit, and the first connection element of the connector unit includes pins embedded in the connector unit so that the second contact element is inserted thereto.

The terminal unit may have a depression into which the connector unit is inserted, the second contact element of the terminal unit includes conductor panels electrically connected to the inflator housing, and the second connection element of the connector unit includes a clip configured to be connected on a first side thereof to the horn wire and to be extended along an outside of the first contact element to contact the conductor panels of the second contact element.

The second contact element may be provided on both sides of the terminal unit, and the second connection element is provided on a second side thereof with opposite protrusions that come into contact with the second contact element.

The opposite protrusions may be inclined downwards with a predetermined angle.

The opposite protrusions and the first contact element may be aligned in a common axis when the connector unit and the terminal unit are coupled.

In another aspect of the present invention, a housing plate may be installed on the inflator housing and electrically connected therebetween, and the switching plate is electrically connected to the horn device and installed to be spaced apart from the housing plate, the switching plate being biased from the housing plate by using insulated elastic member so that the switching plate makes electrical contact with the housing plate in case that external pressure applied to the housing plate is sufficiently enough to surmount an elastic force of the insulated elastic member, thereby operating the horn device.

A central opening may be formed in the housing plate, the terminal unit is provided in the inflator housing exposed through the central opening, and the switching plate is configured to correspond to and face the housing plate so that the switching plate does not interfere with the inflator wires and the horn wire.

The inflator wires and the horn wire may be integrally formed.

The inflator wires and the horn wire may be accommodated in a single cable and then inserted into the one end of the connector unit.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, a switch apparatus for the horn device of a vehicle according to various exemplary embodiments of the present invention will be described with reference to the attached drawings.

Figure 1:
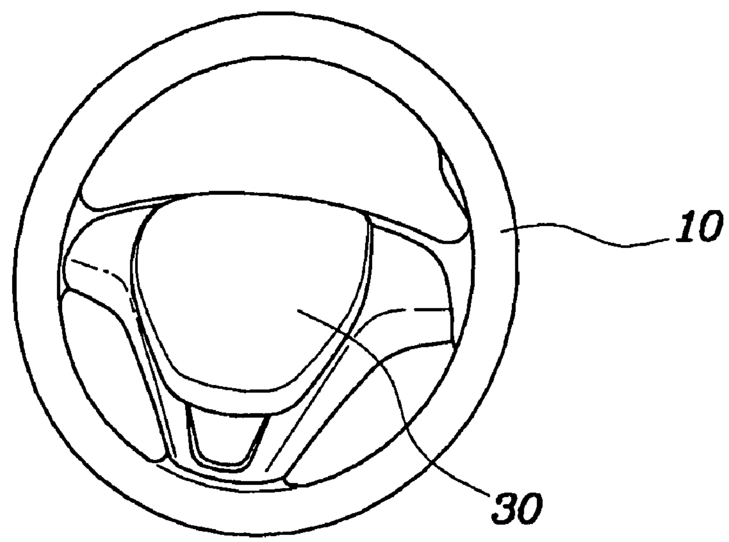
FIG. 1 is a view showing a conventional vehicle steering wheel.
Figure 2:
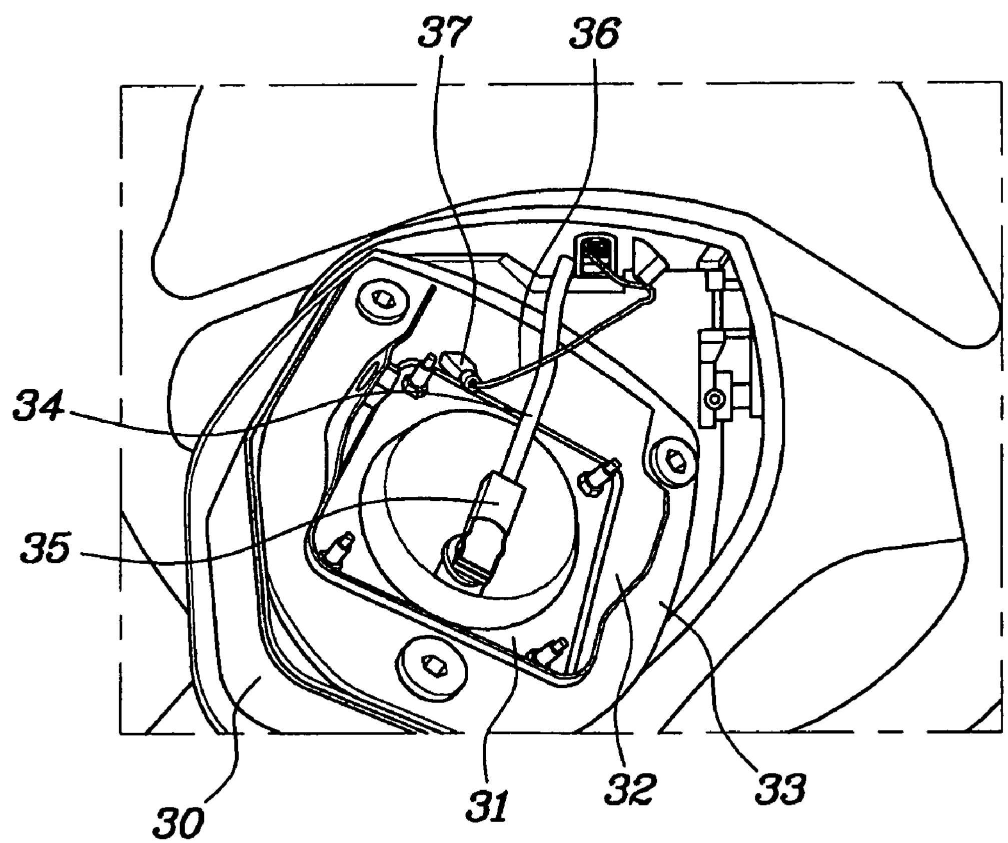
FIG. 2 is a view showing a conventional vehicle switch apparatus for horn device.
Figure 3:
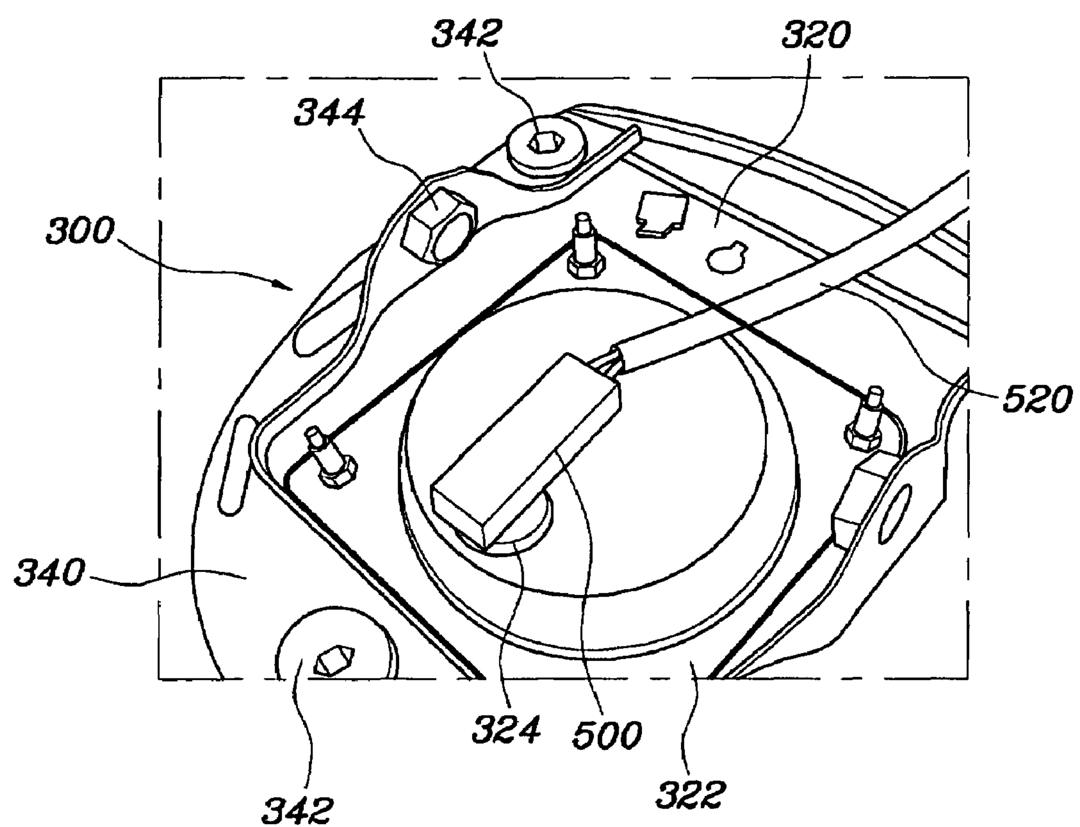
FIG. 3 is a schematic view showing an exemplary switch apparatus for the horn device of a vehicle according to the present invention.

FIG. 3 is a schematic view showing a switch apparatus for the horn device of a vehicle according to an exemplary embodiment of the present invention.

The switch apparatus for horn device includes an inflator housing 322 installed in the steering wheel of a vehicle and configured to accommodate an airbag inflator in an insulated manner; a terminal unit 324 provided in the inflator housing 322, and configured to include a first contact element connected to the internal inflator and a second contact element connected to the inflator housing 322; a switching plate 340 installed to be spaced apart from the inflator housing 322 and to be coupled to the inflator housing 322 using insulated elastic members so that the switching plate 340 makes contact with the inflator housing 322 when external pressure is applied to the inflator housing 322, thereby operating a horn; and a connector unit 500 coupled to the terminal unit 324 with inflator wires and a horn wire inserted into the one end thereof, and provided therein with a first connection element for connecting the inflator wires to the first contact element and a second connection element for connecting the horn wire to the second contact element so that the horn wire and the inflator housing are electrically connected to each other.

FIG. 3 is a schematic view showing the back side of the switch apparatus, and the order of the assembly thereof is realized in such a way that the connector unit 500 is connected to the terminal unit 324 of the inflator housing 322, and the connected connector unit 500 and terminal unit 324 are turned over and then coupled to the steering wheel.

A method of switching on a horn device is realized by the inflator housing 322 and the switching plate 340 making contact. The inflator housing 322 and the switching plate 340 are installed in such a way that they are spaced apart from each other in the state in which a negative pole conducting wire and a positive pole conducting wire are connected respectively to the inflator housing 322 and switching plate 340.

The elastic members 342 are provided between the switching plate 340 and the inflator housing 322, so that, when contact is made and then pressure is released, the switching plate 340 and the inflator housing 322 return to their original states.

A horn wire 526 electrically connected to the inflator housing 322 is assembled with the inflator wires 524 through a casing 501 of the connector unit 500. The inflator wires 524 are directly connected to the inflator, and the horn wire 526 is connected to the inflator housing 322.

The contact for switching can be made in such a way that the inflator housing 322 and the switching plate 340 directly make contact, or that the housing plate 320 is coupled to the inflator housing 322 so that the housing plate 320 and the switching plate 340 can selectively make contact. That is, the housing plate 320 can be installed on the inflator housing 322 so that the housing plate 320 is electrically connected thereto, and the switching plate 340 can be installed to be spaced apart from the housing plate 320 and to be connected to the housing plate 320 using the insulated elastic members 342 so that the switching plate 340 makes contact with the housing plate 320 if pressure is applied to the inflator housing 322.

The housing plate 320 is configured such that electricity is conducted from the horn wire 526, connected to the inflator housing 322, through the inflator housing 322. The housing plate 320 which is electrically connected to the horn wire 526 operates the horn device while making contact with the switching plate 340.

Further, a central opening is formed in the housing plate 320, and the terminal unit 324 is provided in the inflator housing 322 exposed through the central opening, and the switching plate 340 can be installed so as to correspond to and face the housing plate 320 so that the switching plate 340 does not interfere with the inflator wires 524 and the horn wire 526.

It is preferable that the inflator housing 322 be exposed through the central opening of the housing plate 320 and then the connector unit 500 be connected thereto, and that the switching plate 340 be spaced apart from the housing plate 320 along the outside of the inflator housing 322 and then be coupled to the housing plate 320, so that the switching plate 340 does not interfere with the inflator wires 524 and the horn wire 526 when the switching plate is switched on or mounted.

Figure 4:
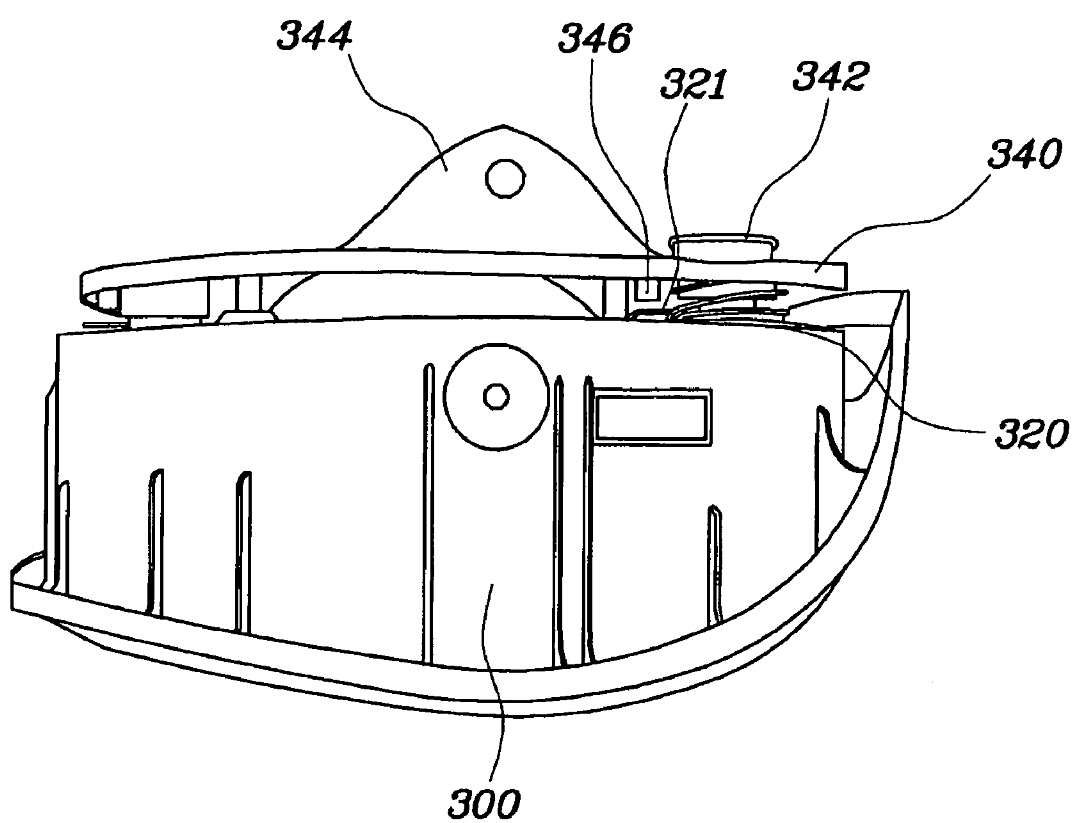
FIG. 4 is a side view showing the switch apparatus for the horn device of a vehicle shown in FIG. 3.

The method of making contact will be described with reference to FIG. 4.

The airbag housing 300 includes an airbag cushion and an inflator. The inflator is accommodated in and coupled to the inflator housing 322. The housing plate 320 is coupled to the inflator housing 322 in a state such that electricity is conducted therebetween. The switching plate 340 is installed above the housing plate 320 in such a way as to be spaced apart from the housing plate 320 through the medium of springs which correspond to the elastic members 342. The springs are fixed in an insulated state, so that contact is not made at ordinary times.

When a vehicle occupant applies pressure to an airbag mounted in the steering wheel, the airbag housing 300 and the housing plate 320 provided on the back side of the airbag housing 300 move, and the housing plate 320 comes into contact with the switching plate 340 while pressing the elastic members 342, thereby making contact.

When contact is being made, the horn device operates and a horn sounds. When the pressure to the elastic members is released, the contact is separated and the housing plate 320 and the switching plate 340 return to their original states. In order to further effectively make contact, each of the housing plate 320 and the switching plate 340 are configured to include protruded contact elements 321 and 346.

One or more fixing units 344 are formed on the switching plate so that the switching plate is fixed inside the steering wheel.

Figure 5:
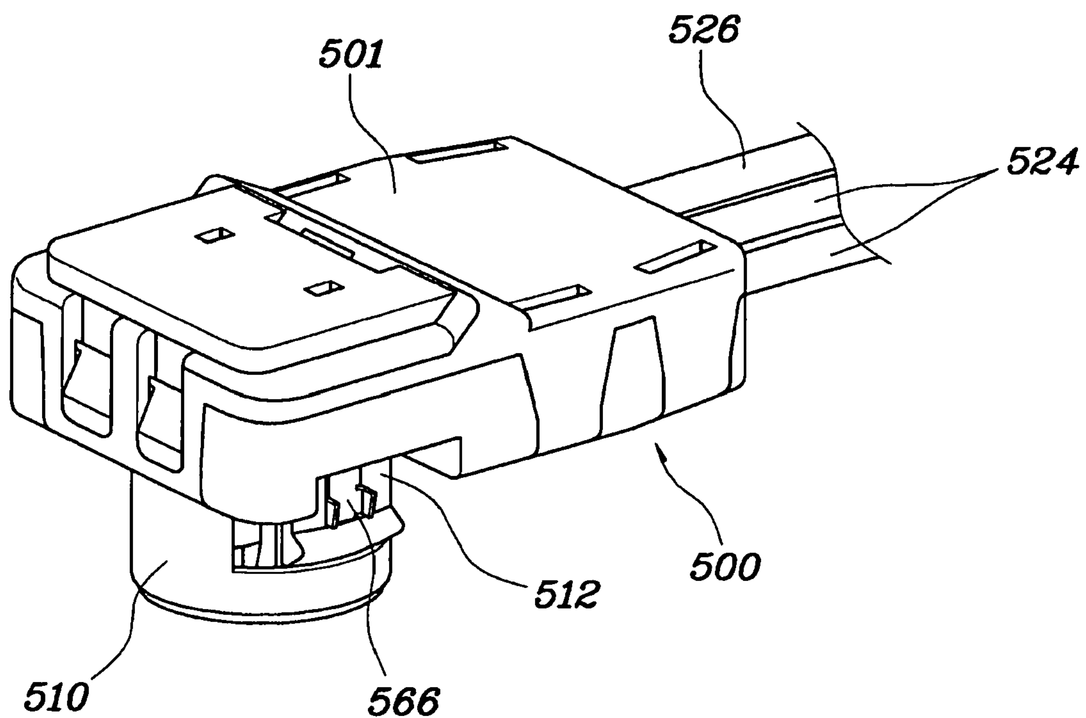
FIG. 5 is a schematic view showing the switch apparatus for the horn device of a vehicle shown in FIG. 3.
Figure 6:
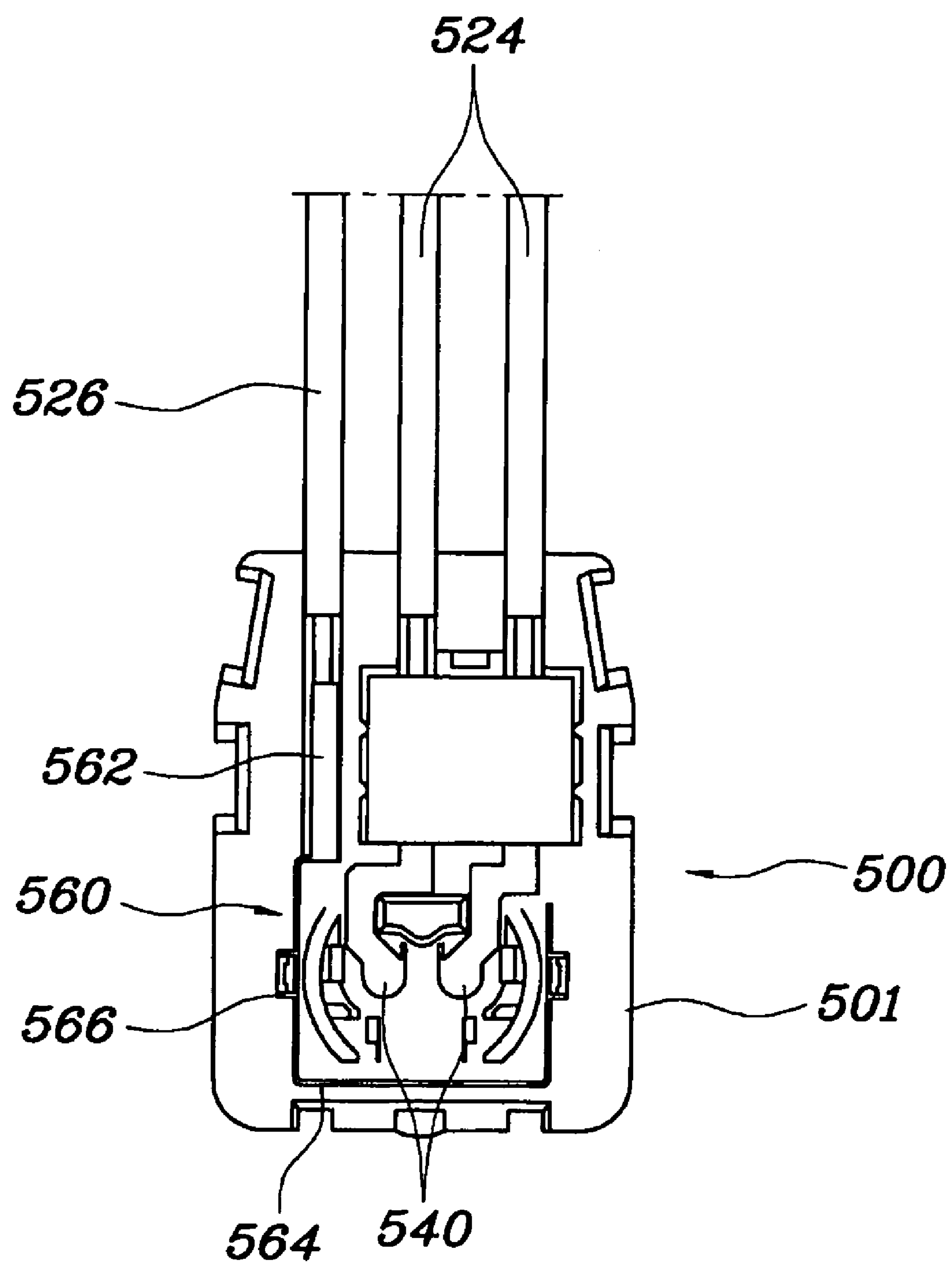
FIG. 6 is a cross-sectional view showing the connector unit shown in FIG. 5.
Figure 7:
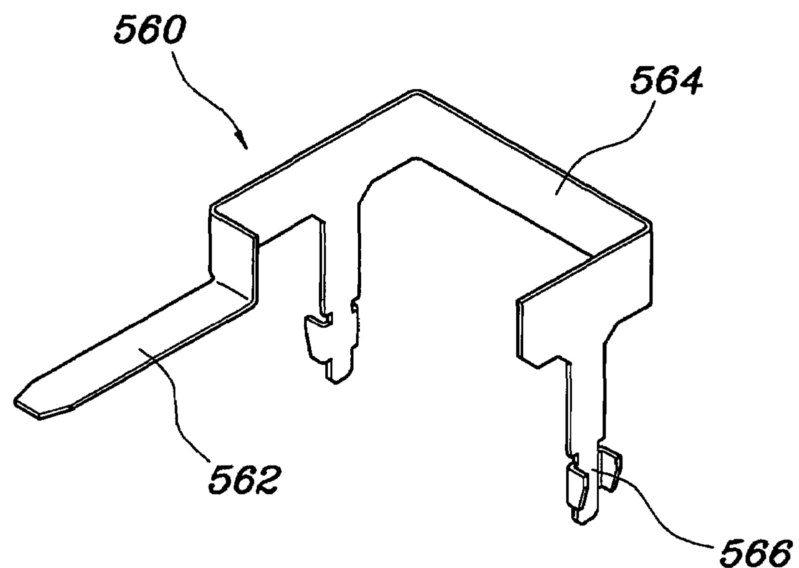
FIG. 7 is a schematic view showing the second connection element of the connector unit shown in FIG. 5.

FIGS. 5 to 7 are views showing the connector unit. Although the connector unit 500 is configured to be inserted into the terminal unit 324 in the illustrated exemplary embodiment, the terminal unit 324 can be inserted into the connector unit 500.

The connector unit 500 includes a first connection element 540 and a second connection element 560, and the terminal unit 324 includes a first contact element 326 and a second contact element 328. The inflator wires 524 are connected to the first connection element 540 and the inflator is connected to the first contact element 326.

When the connector unit 500 is connected to the terminal unit 324, the inflator wires 524 are connected to the inflator. When a signal deploying an airbag is received, the inflator is exploded and the airbag is deployed. The second connection element 560 is electrically connected to the horn wire 526, and the second contact element 328 is connected to the inflator housing 322. Accordingly, when the connector unit 500 is inserted into the terminal unit, the horn wire 526, the inflator housing 322, and the housing plate 320 are electrically connected.

In the state in which the circuit is configured as described above and pressure is applied to the airbag, the housing plate 320 makes contact with the switching plate 340. Of course, a pole which corresponds to remaining pole of the horn device is connected to the switching plate 340 in the same manner as described above.

Three lines are inserted into the connector unit 500. Two of them are inflator wires 524 used to transmit an operation signal to the inflator, and the remaining one is a horn wire 526 connected to the horn device. In the case of the horn device, the remaining line is connected to the switching plate 340.

The inflator wires 524 are connected to the first connection element 540 inside the casing 501 of the connector unit 500, and the first connection element 540 has a clip form, and pins which correspond to the first contact element 326 of the terminal unit 324 are inserted into the first connection element 540. That is, pins are inserted into clips, and the inflator wires 524 are connected to the inflator.

In the case of the horn wire 526, the horn wire 526 is connected to the second connection element 560 inside the connector unit 500 (the connected portion is indicated by reference numeral 562). The second connection element 560 is configured to have a clip form, to be extended inside the casing 501 of the connector unit 500 (the extended portion is indicated by reference numeral 564), and to protrude outside the connector unit (the protruding portion is indicated by reference numeral 566).

The protrusion portion 566 protrudes outside the connector unit 500 through the hole 512 of an insertion portion 510, which corresponds to a potion of the connector unit 500 which will be inserted into the terminal unit 324. Two protrusion portions 566 are configured to be formed at both sides of the connector unit 500. For this purpose, the shape of the second connection element 560 is configured to be connected on one side thereof to the horn wire 526, extended along outside of the first connection element 326 of the connector unit 500, and be provided on the other side with opposite protrusions 566.

Figure 8:
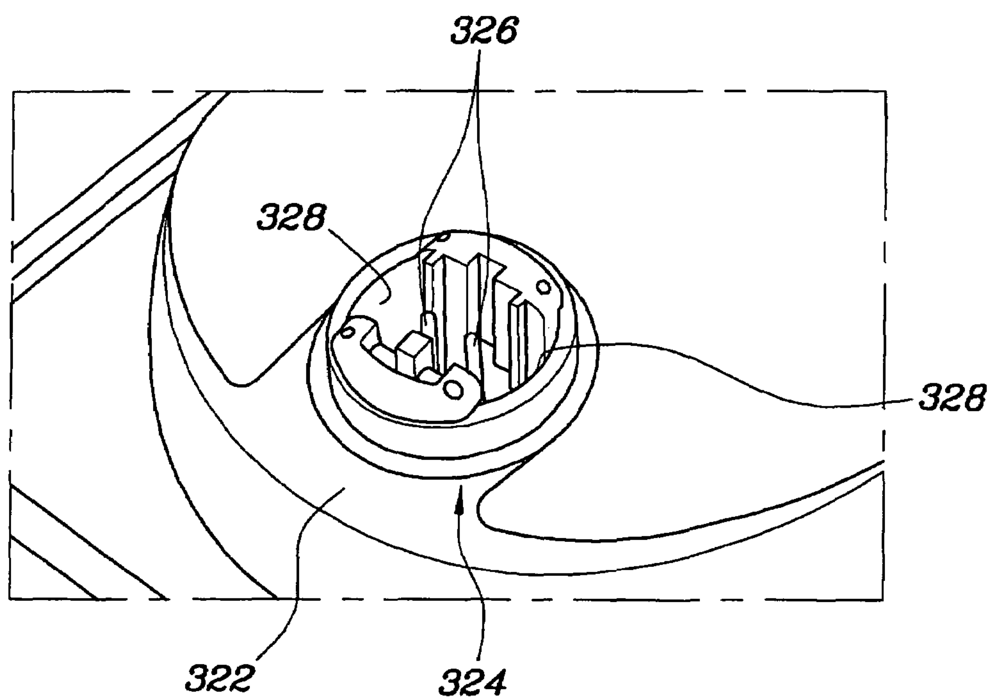
FIG. 8 is a schematic view showing the terminal unit of the switch apparatus for the horn device of a vehicle shown in FIG. 3.

FIG. 8 shows the terminal unit. The terminal unit 324, into which the connector unit 500 is inserted, is configured to have a depression and is provided in the inflator housing 322. The terminal unit 324 maintains the state of being insulated from the inflator. The pins, which correspond to the first contact element 326 of the terminal unit 324, are inserted into the clips, which correspond to the first connection element 540 of the connector unit 500, so that the inflator is connected to the inflator wires.

The terminal unit 324 is insulated from the inflator, with the result that current cannot flow through the inflator other than the inflator wires, so that the stability is secured under normal conditions. Two second contact elements 328, which are electrically connected to the inflator housing 322 and configured to have a conductor panel form, are provided at both sides of the terminal unit 324 in inner surface thereof. The second connection element 560 of the connector unit 500 inserted into the terminal unit 324 is configured to have a clip form, to protrude outside, and to be connected to the second contact element 328 of the terminal unit so as to be electrically connected. In particular, both the protruding portions 566 slidably contacts the both second contact elements 328. Since end portions of the protruding portions 566 are inclined downwards with a predetermined angle, the protruding portions 566 can slidably be coupled to the second contact elements 328.

With regard to the connection circuit of the horn wire, the horn wire 526 is connected to the second contact element 328 of the terminal unit 324 through the second connection element 560 of the connector unit 500. The second contact element 328 is electrically connected to the inflator housing 322, and the inflator housing 322 may be electrically connected to the housing plate 320. The switching plate 340 is connected to another pole of the horn device, so that the horn device operates when the housing plate 320 and/or the inflator housing 322 makes contact with the switching plate 340.

Further, the second connection element 560 protrudes toward both sides of the connector unit 500 with protruding portions 566, so that the second connection element 560 can be stably connected to the second contact element 328 when the connector unit 500 is inserted into the terminal unit 324.

According to various aspects of the switch apparatus for horn device of the present invention, the horn wire and the inflator wires are integrated in a single cable 520 and then coupled to the inflator housing, so that it is not required to separately provide a horn wire and a connector unit for the horn wire, and the number of separate components is reduced, so that the stability and durability of a switch can be secured.

In another aspect of the present invention, the horn wire is included in a cable, together with inflator wires, so that there is no risk of disconnection and the number of manufacturing steps is reduced. Further, since the horn wire does not interfere with the inflator, a phenomenon whereby the airbag comes off during operation is improved.

Further, since a separate connector unit is not used, the number of components is reduced, so that the problem of durability, that is, separation of the connector unit, is improved.

For convenience in explanation and accurate definition in the appended claims, the terms "front" and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A switch apparatus for horn device of a vehicle, comprising:

an inflator housing installed in a steering wheel of the vehicle, and configured to accommodate an airbag inflator, wherein the inflator housing and the airbag inflator are insulated therebetween;

a terminal unit provided in the inflator housing, and configured to include a first contact element electrically connected to the inflator accommodated in the inflator housing and a second contact element electrically connected to the inflator housing;

a switching plate electrically connected to the horn device and installed to be spaced apart from the inflator housing, the switching plate being biased from the inflator housing by using insulated elastic member so that the switching plate makes electrical contact with the inflator housing in case that external pressure applied to the inflator housing is sufficiently enough to surmount an elastic force of the insulated elastic member, thereby operating the horn device; and a connector unit coupled to the terminal unit, the connector unit having inflator wires and a horn wire inserted into one end of the connector unit and provided therein with a first connection element for connecting the inflator wires to the first contact element of the terminal unit and a second connection element for connecting the horn wire to the second contact element of the terminal unit so that the horn wire and the inflator housing are electrically connected each other.

2. The switch apparatus as set forth in claim 1, wherein the terminal unit has a depression into which the connector unit is inserted, the first contact element of the terminal unit includes pins provided inside the terminal unit, and the first connection element of the connector unit includes clips embedded in the connector unit so that the first contact element is inserted thereto.

3. The switch apparatus as set forth in claim 1, wherein the terminal unit has a depression into which the connector unit is inserted, the first contact element of the terminal unit includes clips provided inside the terminal unit, and the first connection element of the connector unit includes pins embedded in the connector unit so that the second contact element is inserted thereto.

4. The switch apparatus as set forth in claim 1, wherein the terminal unit has a depression into which the connector unit is inserted, the second contact element of the terminal unit includes conductor panels electrically connected to the inflator housing, and the second connection element of the connector unit includes a clip configured to be connected on a first side thereof to the horn wire and to be extended along an outside of the first contact element to contact the conductor panels of the second contact element.

5. The switch apparatus as set forth in claim 4, wherein the second contact element is provided on both sides of the terminal unit, and the second connection element is provided on a second side thereof with opposite protrusions that come into contact with the second contact element.

6. The switch apparatus as set forth in claim 5, wherein the opposite protrusions are inclined downwards with a predetermined angle.

7. The switch apparatus as set forth in claim 6, wherein the opposite protrusions and the first contact element are aligned in a common axis when the connector unit and the terminal unit are coupled.

8. The switch apparatus as set forth in claim 1, wherein a housing plate is installed on the inflator housing and electrically connected therebetween, and the switching plate is electrically connected to the horn device and installed to be spaced apart from the housing plate, the switching plate being biased from the housing plate by using insulated elastic member so that the switching plate makes electrical contact with the housing plate in case that external pressure applied to the housing plate is sufficiently enough to surmount an elastic force of the insulated elastic member, thereby operating the horn device.

9. The switch apparatus as set forth in claim 8, wherein a central opening is formed in the housing plate, the terminal unit is provided in the inflator housing exposed through the central opening, and the switching plate is configured to correspond to and face the housing plate so that the switching plate does not interfere with the inflator wires and the horn wire.

10. The switch apparatus as set forth in claim 1, wherein the inflator wires and the horn wire are integrally formed.

11. The switch apparatus as set forth in claim 1, wherein the inflator wires and the horn wire are accommodated in a single cable and then inserted into the one end of the connector unit.

12. A passenger vehicle comprising the switch apparatus as set forth in claim 1.

13. A connector unit for horn device of a vehicle, comprising:

a casing;

inflator wires and a horn wire inserted into a first end of the casing;

a first connection element and a second connection element respectively connected to the inflator wires and the horn wire; and wherein a second end of the casing is inserted into a inflator housing and the first connection element is connected to a airbag inflator accommodated in the inflator housing and a second connection element is extended to an outside of the casing so that the horn wire and the inflator housing electrically connected each other.

14. The connector unit as set forth in claim 13, wherein the first connection element of the connector unit includes clips embedded in the casing and the second connection element of the connector unit includes a clip configured to be connected on a first side thereof to the horn wire and to be extended along an outside of the casing.

15. The connector unit as set forth in claim 14, wherein the second connection element is provided on a second side thereof with opposite protrusions that come into contact with the inflator housing.

16. The connector unit as set forth in claim 15, wherein the opposite protrusions are inclined downwards with a predetermined angle.

17. The connector unit as set forth in claim 13, wherein the inflator wires and the horn wire are integrally formed.

18. The connector unit as set forth in claim 13, wherein the inflator wires and the horn wire are accommodated in a single cable and then inserted into the first end of the casing.

* * * * *